Aug. 29, 1967  E. ARMSTRONG  3,337,876
CONSTANT-VOLUME UNDERWATER EXPOSURE SUIT
Filed July 6, 1965

INVENTOR.
EDMOND ARMSTRONG
BY Fulwider, Patton, Rieber,
Lee and Utecht
ATTORNEYS

# United States Patent Office 3,337,876
Patented Aug. 29, 1967

3,337,876
CONSTANT-VOLUME UNDERWATER
EXPOSURE SUIT
Edmond Armstrong, 14569 Plantana Drive,
La Mirada, Calif. 90638
Filed July 6, 1965, Ser. No. 469,533
15 Claims. (Cl. 2—2.1)

The present invention relates to underwater exposure suits for skin diving and more particularly to a novel constant-volume underwater exposure suit.

Underwater exposure suits used by skin divers are generally made of a sponge rubber material sandwiched between thin inner and outer facing sheets or layers of rubber. The rubber sheets are impervious to water and the sponge rubber provides insulation against cold and retains the diver's body heat to keep the diver warm. At shallow depths, such suits are very effective in protecting divers from the cold and in practice have even allowed divers to swim and dive among arctic ice floes.

Unfortunately, at great depths such conventional underwater exposure suits are relatively useless. In particular, as a diver descends during his dive, the water pressure acting on his suit increases. At great depths, the pressure compresses the sponge rubber material, causing the air cells thereof to collapse. When this occurs, the suit becomes almost valueless in retaining body heat, which is carried away faster than it can be generated by the diver's body.

Also, as the sponge rubber collapses, its displacement and volume decreases, with a reduction in the diver's buoyancy the deeper he goes. This can present problems to the diver at great depths.

In view of the foregoing, it is a general object of the present invention to provide an improved underwater exposure suit for deep water use which overcomes the disadvantages of conventional exposure suits at such depths.

Another object of the present invention is to provide an underwater exposure suit which maintains a constant volume even at great depths and at high pressures.

A further object of the present invention is to provide an underwater exposure suit which traps body heat and maintains the diver warm even in icy water and at great depths.

Still another object of the present invention is to provide an underwater exposure garment, including a double-layer construction having an incompressible liquid or semi-solid insulating material disposed between connecting inner and outer layers of water resistant material.

The foregoing as well as other objects and advantages of the present invention may be more clearly understood by reference to the following detailed description when taken with the drawing, which, by way of example only, illustrates an underwater exposure suit and two alternate constructions thereof embodying the features of the present invention.

Figure 1:
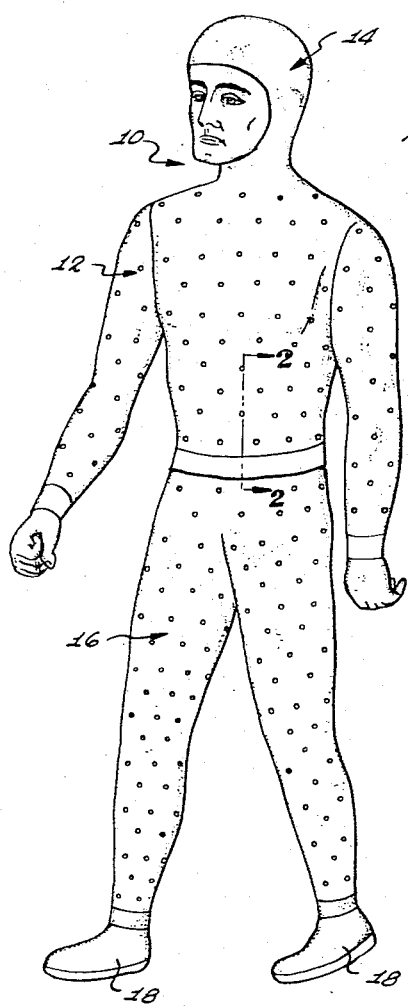
FIGURE 1 is a perspective view of the underwater exposure suit being worn by a diver.

In the drawing, the underwater exposure suit is represented generally by the numeral 10 and includes a jacket-like top 12, having a hood 14 connected thereto, and pants 16. Shoulder straps (not shown) extend upward from the pants 16 under the jacket 12 and over the diver's shoulders to provide support for the pants. A pair of boots 18 complete the underwater exposure suit.

The boots and hood may be of conventional rubber construction. The jacket and pants, however, are formed of an incompressible, waterproof, double-layer construction which is relatively lightweight yet insulates the diver against extreme cold.

In general, the double-layer construction includes inner and outer body covering layers 20 and 22 connected together at different points and sealed to each other along marginal edges with an incompressible liquid or semi-solid insulating material 24 between the layers.

The materials of the double layer construction may take various forms. Preferably, however, the inner and outer layers 20 and 22 are formed of a water resistant or repellent material which is impervious to the insulating material 24. The material forming the inner and outer layers 20 and 22 should also be pliable and easy to work with in constructing the jacket and pants and should be capable of sealing upon itself with heat or pressure-sensitive, water insoluble adhesives, or with other suitable means.

The insulating material 24 must be substantially incompressible at the high pressures developed at great water depths and should have a specific gravity of about one to have a neutral buoyancy. Also, the insulating material 24 should be water insoluble and more viscous than water to prevent posible dilution of the material upon exposure to water.

In particular, the greater the viscosity of the material 24, the lower the circulation of heat through the material and the higher its insulating properties both to protect against cold and to retain the body heat of the diver. Further, if a leak or small hole should develop in the inner or outer layers 20 or 22, the more viscous materials act as self-sealants to prevent leakage of water into the double-layer construction or the seepage of the insulating material 24 out of the suit.

Moreover, the use of water insoluble, highly viscous agents as the insulating material 24, allows the inner and outer layers 20 and 22 to be formed of other than water impervious materials, such as heavy fabrics, e.g., canvas. Such fabrics are pliable and relatively easy to handle in constructing different garments and are generally less expensive than thin sheets of water impervious materials, such as rubber, thereby substantially reducing the overall cost of the preferred form of the underwater exposure suit 10. So long as the fabric is impervious to the insulating material 24 and water insoluble, water will not flow through the fabric and the water insoluble material 24 will not be displaced by water.

It is also desirable for the material 24 to be odorless and preferably colorless so that the suit will have a neutral aroma and the layers 20 and 22 will not be discolored.

In general, lubricating agents, including greases, mineral and vegetable oils, have proven most satisfactory as the insulating material 24. More specifically, within this class, petrolatum is particularly preferred. Petrolatum, commonly known as petroleum jelly, is readily available, inexpensive, and is an unctuous mass of light amber or white color of a transparent character. Petrolatum is free or nearly free of odor and taste and has a specific gravity of 0.815 to 0.880 at 60° and melts between 38 and 60° C. Petrolatum is also insoluble in water and therefore meets all of the previously outlined necessary and desired characteristics for the insulating material 24.

Figure 2:
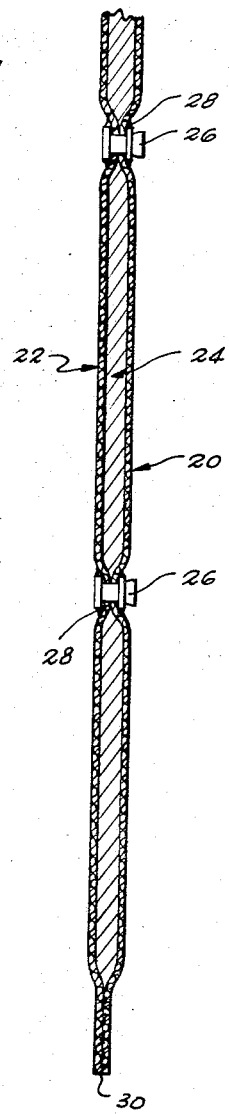
FIGURE 2 is a fragmentary sectional view taken along the line 2—2 in FIGURE 1, illustrating the inner construction of the exposure suit.

Two different forms of the double-layer construction are illustrated in the drawing. In FIGURES 1 and 2, the inner and outer layers 20 and 22 are formed of sheets of canvas joined together at spaced points by a plurality of rivets 26. The heads of the rivets are surrounded by a waterproof sealant 28 to insure that water will not leak through the structure. The inner and outer layers are also sealed along their marginal edges by a waterproof, pressure-sensitive adhesive 30. The insulating material 24, here petrolatum, is disposed between the layers 20 and 22 to complete the double-layer construction. In this regard, the petroleum is heated and then poured between the layers 20 and 22 before the top edges of the layers are sealed. The rivets 26 limit the separation of the layers 20 and 22 and the space between the layers slowly fills with the petrolatum. When full, the upper edges of the layers 20 and 22 are sealed to close the double-layer construction for the jacket 12 and pants 16.

Figure 3:
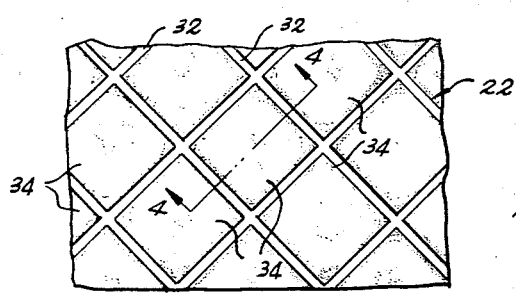
FIGURE 3 is a fragmentary front view of an alternate form of construction for the underwater exposure suit.
Figure 4:
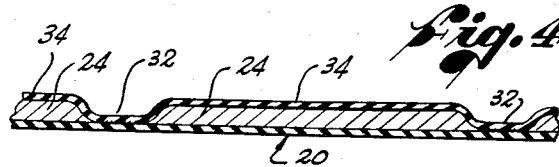
FIGURE 4 is a fragmentary sectional view taken along the line 4—4 in FIGURE 3.

In FIGURES 3 and 4, the layers 20 and 22 are formed of thin sheets of rubber and are joined, as by heat treatment, along a plurality of transverse lines 32 to form a plurality of pockets 34. The pockets 34 are filled with petrolatum.

Since petrolatum is incompressible, the volume of the underwater exposure suit 10 does not decrease as the diver descends during his dive and the insulating characteristics of the petrolatum remain constant to keep the diver warm even at great depths and in icy water. Also, the buoyancy of the suit does not change during the driver's descent.

While particular forms of double-wall constructions have been described in the specification for the underwater exposure suit 10, changes and modifications may be made in the illustrated forms without departing from the spirit of the present invention. It is therefore intended that the present invention be limited in scope only by the terms of the following claims.

I claim:
1. In an underwater exposure suit having torso and limb enclosing portions comprising:
   an inner, body covering layer of water resistant and lubricating agent impervious material;
   an outer layer of water resistant and lubricating agent impervious material over said inner layer, attached thereto at predetermined points and sealed thereto along marginal edges;
   and a substantially incompressible, lubricating agent disposed between said inner and outer layers.
2. The combination of claim 1 wherein said lubricating agent is water insoluble and substantially odorless.
3. The combination of claim 2 wherein said lubricating agent is petrolatum.
4. In an underwater exposure suit having torso and limb enclosing portions comprising:
   an inner, bodying covering layer of water resistant and lubricating agent impervious material;
   an outer layer of water resistant and lubricating agent impervious material over said inner layer, attached thereto at predetermined points and sealed thereto along marginal edges;
   and a substantially incompressible unctuous mass disposed between said inner and outer layers.
5. In an underwater exposure suit having torso and limb enclosing portions comprising:
   an inner, body covering layer of water resistant and lubricating agent impervious material;
   an outer layer of water resistant and lubricating agent impervious material over said inner layer;
   means connecting said inner layer to said outer layer at spaced intervals;
   means sealing the marginal edges of said inner layer to said outer layer;
   and a substantially incompressible, lubricating agent disposed between said inner and outer layers.
6. The combination of claim 5 wherein said lubricating agent is water insoluble and substantially odorless.
7. The combination of claim 6 wherein said lubricating agent is petrolatum.
8. In an underwater exposure suit having torso and limb enclosing portions comprising:
   an inner, body covering layer of water resistant and lubricating agent impervious material;
   an outer layer of water resistant and lubricating impervious material over said inner layer;
   means connecting said inner layer to said outer layer at spaced intervals;
   means sealing marginal edges of said inner layer to said outer layer;
   and a substantially incompressible, unctuous mass disposed between said inner and outer layers.
9. In an underwater exposure suit having torso and limb enclosing portions comprising:
   an inner, body covering layer of water resistant and lubricating agent impervious material;
   an outer layer of water resistant and lubricating agent impervious material over said inner layer and sealed to said inner layer along transverse lines to define a plurality of pockets between said inner and outer layers;
   and a substantially incompressible, lubricating agent disposed within said pockets.
10. The combination of claim 9 wherein said lubricating agent is water insoluble and substantially odorless.
11. The combination of claim 10 wherein said lubricating agent is petrolatum.
12. In an underwater exposure suit having torso and limb enclosing portions comprising:
   an inner, body covering layer of water resistant and lubricating agent impervious material;
   an outer layer of water resistant and lubricating agent impervious material over said inner layer and sealed to said inner layer along transverse lines to define a plurality of pockets between said inner and outer layers;
   and a substantially incompressible, unctuous mass disposed within said pockets.
13. A constant-volume underwater exposure suit comprising:
   a jacket-like garment;
   and a pant-like garment, said jacket and pant-like garments each comprising inner and outer layers of water resistant and lubricating agent impervious materials attached to each other at predetermined points and sealed together along marginal edges, and a substantially incompressible lubricating agent disposed between said inner and outer layers.
14. The suit of claim 13 wherein said lubricating agent is water insoluble and substantially odorless.
15. The suit of claim 14 wherein said lubricating agent is petrolatum.

References Cited
UNITED STATES PATENTS

| | | | |
|---|---|---|---|
| 687,077 | 11/1901 | Sprang | 2—82 |
| 1,432,643 | 10/1922 | Toborek et al. | 2—81 X |
| 3,098,563 | 7/1963 | Skees | 2—2.1 X |

JORDAN FRANKLIN, Primary Examiner.

G. H. KRIZMANICH, Examiner.